US008727691B2

(12) United States Patent
Flora et al.

(10) Patent No.: US 8,727,691 B2
(45) Date of Patent: May 20, 2014

(54) SHAFT FURNACE CHARGING DEVICE AND CORRESPONDING DISTRIBUTION CHUTE

(75) Inventors: Bruno Flora, Pontpierre (LU); Jeff Vandivinit, Dalheim (LU); Claude Thinnes, Kehlen (LU)

(73) Assignee: Paul Wurth S.A., Luxembourg (LU)

( * ) Notice: Subject to any disclaimer, the term of this patent is extended or adjusted under 35 U.S.C. 154(b) by 560 days.

(21) Appl. No.: 13/063,791

(22) PCT Filed: Jul. 17, 2009

(86) PCT No.: PCT/EP2009/059244
§ 371 (c)(1),
(2), (4) Date: Mar. 14, 2011

(87) PCT Pub. No.: WO2010/028894
PCT Pub. Date: Mar. 18, 2010

(65) Prior Publication Data

US 2011/0164950 A1 Jul. 7, 2011

(30) Foreign Application Priority Data

Sep. 12, 2008 (LU) .......................................... 91480

(51) Int. Cl.
*B65G 1/00* (2006.01)
*B65G 65/00* (2006.01)

(52) U.S. Cl.
USPC ........ 414/299; 414/300; 414/301; 110/101 R; 110/115; 126/107; 126/501

(58) Field of Classification Search
USPC .............. 110/101 R, 115–117; 414/193, 195, 414/299–301; 126/10, 68, 73, 107, 501, 126/621
See application file for complete search history.

(56) References Cited

U.S. PATENT DOCUMENTS

| | | | | |
|---|---|---|---|---|
| 3,814,403 | A | 6/1974 | Legille | |
| 5,022,806 | A | 6/1991 | Lonardi | |
| 6,916,146 | B1 * | 7/2005 | Lonardi et al. | 414/293 |

FOREIGN PATENT DOCUMENTS

| | | | |
|---|---|---|---|
| CN | 200952022 | Y | 9/2007 |
| DE | 3342572 | A1 | 6/1984 |

(Continued)

OTHER PUBLICATIONS

International Search Report PCT/EP2009/059244; Dated Sep. 25, 2009.

(Continued)

*Primary Examiner* — Jeffrey Shapiro
(74) *Attorney, Agent, or Firm* — Cantor Colburn LLP

(57) ABSTRACT

A charging device for a shaft furnace, in particular for a blast furnace and a cooperating distribution chute are proposed, where the distribution chute has an elongated chute body providing a sliding channel for bulk material and two chute-mounting members attached laterally to either side of the chute body for mounting the distribution chute to the charging device, the charging device including a mechanism for rotating the distribution chute, the mechanism having a rotatable support rotor with two suspension flanges cooperating with the chute-mounting members of the distribution chute for mounting the distribution chute, where each chute-mounting member of the chute includes a hook-shaped portion that forms a suspension hook for mounting the distribution chute to the suspension flanges, each suspension flange in turn has a support configured for engagement with the hook-shaped portion of the chute along a hook engagement direction, and furthermore, each chute-mounting member includes an abutment portion that cooperates with a counter-abutment on the corresponding suspension flange to provide abutment in a direction transversal to the hook engagement direction (C) so as to preclude pivoting of the chute about the supports of the suspension flanges.

16 Claims, 4 Drawing Sheets

(56) References Cited

FOREIGN PATENT DOCUMENTS

| | | | |
|---|---|---|---|
| EP | 1453983 | B1 | 1/2006 |
| EP | 1935993 | A1 | 6/2008 |
| GB | 1478527 | | 7/1977 |
| LU | 65663 | A | 10/1972 |
| WO | 0118255 | A1 | 3/2001 |

OTHER PUBLICATIONS

Chinese Office Action for corresponding Chinese application 200980133729.3 filed on Jul. 17, 2009, Mail date Nov. 5, 2012.

* cited by examiner

SHAFT FURNACE CHARGING DEVICE AND CORRESPONDING DISTRIBUTION CHUTE

TECHNICAL FIELD

The present invention generally relates to charging devices for distributing bulk material in a shaft furnace and especially in a blast furnace. The present invention relates in particular to a configuration and method for mounting a distribution chute used for distributing bulk material to such a charging device.

BACKGROUND

Typically, such charging devices comprise a mechanism for rotating a support rotor adapted to support the distribution chute. The chute has an elongated chute body e.g. a trough-shaped main part, which defines a sliding channel with an outlet for distributing bulk material in the furnace, and mounting members attached to either side of the elongated main body for removably attaching the distribution chute to the support rotor. For rotating the chute, the support rotor is rotatable about a substantially vertical axis, which generally coincides with the furnace axis. For supporting the chute, the support rotor includes two suspension flanges that cooperate with the chute-mounting members of the distribution chute for removable mounting of the latter. Typically, the suspension flanges are mounted in opposite facing relationship and pivotable on the rotor about an axis perpendicular to the axis of rotation of the rotor to set the pivoting angle of the chute. Examples of such charging devices are described e.g. in U.S. Pat. No. 3,814,403, U.S. Pat. No. 5,022,806 and DE 3342572.

As will be understood, the chute of such charging devices is subject to wear and has to be removable to allow its replacement by a new or refurbished chute. This is because the considerable mass of charge material sliding over the chute causes significant abrasion. Therefore, the configuration used for mounting the chute should allow uncomplicated installation and removal of the chute while ensuring transmission of significant pivoting torques.

For removable mounting, the chute in the device described in U.S. Pat. No. 3,814,403 is provided with lateral suspension journals. On one side it comprises two separate journals, which are received in two separate seats of a suspension flange that is connected to a pivoting mechanism so that this suspension flange can transmit the pivoting torque to the chute. On the opposite side, it comprises a single suspension journal, which can rotate in a seat of a fixed flange. The journals are fixed in the two flanges by means of transverse wedges.

The chute in the device described in U.S. Pat. No. 5,022,806 is also provided with lateral suspension journals. On one side it comprises two separate shaft journals, which are received in a seat of a suspension flange connected to a pivoting mechanism, so that this suspension flange can transmit the pivoting torque to the chute. On the opposite side, it comprises a single journal, which is received in a flange that can rotate on a pivot.

In the device described in German patent application DE 3342572, the chute is provided with two suspension members of special, duckbill shape, which is also illustrated in U.K. patent GB 1 478 527. Each suspension member is received by a corresponding three-point suspension formed by three journals on each suspension flange that can be driven in rotation by the pivoting mechanism. The special shape of the suspension members provides for fixing the chute to the three-point suspension of the suspension flange while allowing the chute to be easily withdrawn by lifting the outlet end of the chute.

A further chute-mounting mechanism in a charging device is disclosed in PCT patent application WO 01/18255. The chute of this device is provided with two lateral suspension arms extending upwards where they are connected to a support rotor. A cylindrical suspension pin is associated with each suspension arm for pivotably connecting it to the support rotor. Each of these two suspension pins is arranged in retractable manner in a bearing of the support rotor. A control lever is connected to the support rotor by means of an articulated joint. A driving mechanism is connected to the control lever to transmit to the latter a pivoting torque. In order to transmit a pivoting torque to the suspension arms, the control lever is provided with a stop, which engages a counterstop provided on the respective suspension arm of the chute.

A disadvantage of the above mounting configurations is that they involve a relatively time-consuming and complicated installation and removal procedure that also typically requires custom-made equipment, i.e. a special purpose device for handling the chute during installation or removal. Such an additional device is described in Luxembourg patent LU 65663 and also in PCT patent application WO 01/18255. This device is required among others because the chute must be held in position underneath the charging device before it can be fixed to the support rotor and because the risk of inadvertently dropping the chute must definitely be avoided.

BRIEF SUMMARY

Accordingly, the invention provides a charging device and a corresponding distribution chute, which allow simplified but safe removal and installation of the chute, e.g. for replacing a worn-off chute by a new or refurbished chute.

The present invention proposes a charging device for a shaft furnace, in particular for a blast furnace, that comprises a distribution chute with an elongated chute body, typically in the form of trough shaped main part, that defines a sliding channel for bulk material and two chute-mounting members attached laterally to either side of the chute body for removable mounting of the distribution chute to the charging device. The device further comprises a mechanism for rotating the distribution chute, the mechanism having a rotatable support rotor with two suspension flanges that cooperate with the chute-mounting members of the distribution chute for mounting the latter to the support rotor. Typically, the suspension flanges are mounted in opposite facing relationship and pivotable on the rotor about an axis perpendicular to the axis of rotation of the rotor.

In accordance with the invention as defined in the appended claims, each chute-mounting member comprises a hook-shaped portion that forms a suspension hook for hooking the distribution chute onto the suspension flanges. Each suspension flange has a support configured for engagement with the hook-shaped portion along a hook engagement direction. Furthermore, each chute-mounting member comprises an abutment portion that cooperates with a counter-abutment on the corresponding suspension flange to provide abutment in a direction transversal to the hook engagement direction so as to preclude pivoting of the chute about the supports of the suspension flanges. Hook-shaped in the present context is to mean a portion that is at least partially recurved or bend backwards with respect to a direction from the center of gravity of the chute towards the general location of attachment. Transversal in the present context is to be understood in the geometrical sense, i.e. transversal not necessarily strictly perpendicular, although an abutment in a substantially perpendicular direction is preferred to facilitate construction and engagement.

The proposed hook-type mounting configuration provides a reliable means of support that can be easily engaged and disengaged by simple translation of the chute according to a lifting-shifting-lowering motion and vice-versa. In particular, as opposed to chutes having a coupling of the type shown in GB 1 478 527, it is neither necessary to pivot the chute nor to engage any journals during mounting to achieve a secure mounting of the chute on the support rotor. Hence, special chute installation devices, as typically required in the prior art for holding the chute during installation and removal, are no longer required either. Without further measures, the chute is safely mounted to the support rotor of the charging device, i.e. the weight of the chute is supported via the hook-shaped portions and the cooperating supports, when the hook-shaped portions are engaged on the suspension flanges. Unintended swaying of the chute relative to the suspension flanges is impeded by means of the abutment portions of the chute-mounting member and the cooperating counter abutments of the suspension flanges. Hence, any additional safety measures, such as blocking by means of eccentric tappets can be taken afterwards, when the chute is already safely mounted. The weight bearing parts of the hook-type configuration that provide safe mounting do not include movable parts that could be subject to malfunction.

The invention also proposes a distribution chute having the features set out above.

In particular, the hook-shaped portion typically includes a projection and a recess and may therefore, according to a first variant, engage the supports on the suspensions flanges by means of the recess ("male" connecting part on the flanges, "female" connecting part on the mounting portions) or, according to a second variant, by means of the projection ("male" connecting part on the mounting portions, "female" connecting part on the flanges).

Regarding the abutment portions and the cooperating counter-abutments, it will be understood, that either one or both of them may include a flat stop face oriented in parallel with said engagement direction in order to facilitate hooking engagement, in particular in case the hook-shaped portion and the are designed for a positive fit. Nevertheless, in order to preclude pivoting of the chute-mounting members about the supports on the suspension flanges, any other transverse orientation is also possible sufficient.

The method for installing the proposed distribution chute in the proposed charging device is set out herein. The simple and fail-safe basic steps of this method are:

- fastening hoisting means to the mounting members;
- hoisting the mounting members into the support rotor using the hoisting means, in particular, using a hoisting cable, rope or chain guided through the charging device; and
- hooking the distribution chute to the support rotor by engaging each hook-shaped portion on the supports along the hook engagement direction. Thereby the distribution chute is supported through the hook-shaped portions on the supports and accidental pivoting of the chute about the supports is precluded by virtue of the abutment portions on the chute being in abutment with the counter-abutments on the flanges.

As will be understood, removal is equally simple and fail-safe by reversing the steps carried out for installation.

BRIEF DESCRIPTION OF THE DRAWINGS

Preferred embodiments and advantages of the invention will now be described, by way of example, with reference to the accompanying drawings in which.

In these drawings, features of further embodiments whose function is the same or basically the same as in the first embodiment, are identified by reference numbers made up of the number of the particular embodiment in question followed by the reference number used in connection with the first embodiment.

DETAILED DESCRIPTION

Figure 1:
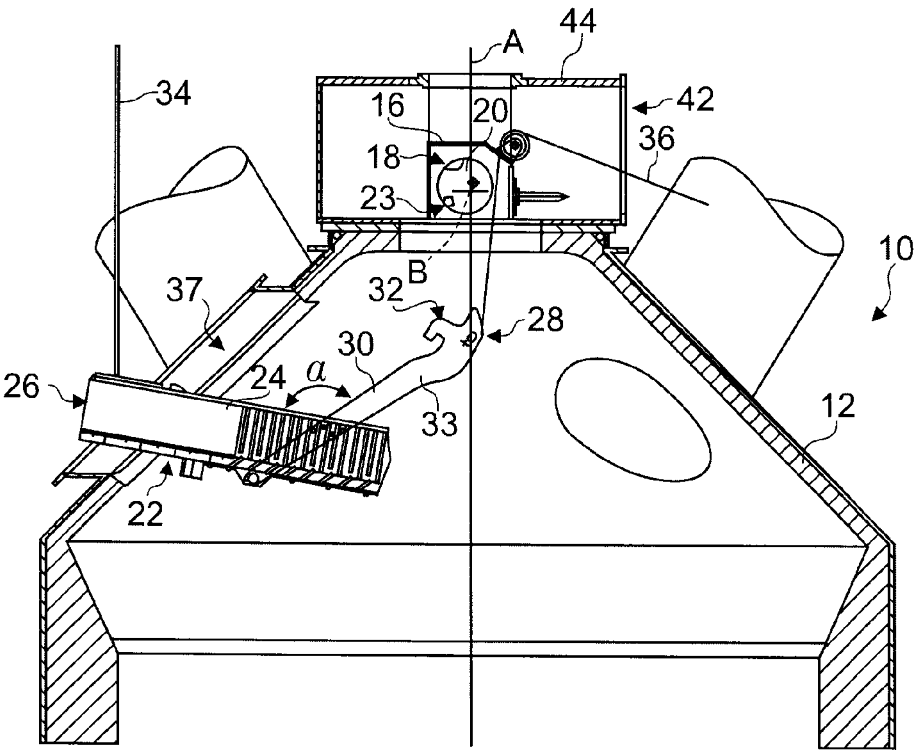
FIG. 1 is a vertical cross sectional view of a blast furnace showing a distribution chute in side view during a chute replacement procedure and partially showing a charging device arranged on the furnace throat.

FIG. 1 shows a blast furnace 10 in vertical cross section in the region of the furnace throat 12. A charging device 14 is arranged on top of the furnace throat 12. The working principle of the charging device 14 is that of the well known, so called BELL LESS TOP™ type, which allows precise distribution of charge material (burden) to any point inside the blast furnace 10. Only those parts of the charging device 14 that are related to the present invention are shown in the figures. Further structural and functional aspects of such charging devices are described in U.S. Pat. No. 3,814,403, U.S. Pat. No. 5,022,806 and DE 3342572.

The charging device 14 comprises a support rotor 16, which is only schematically shown. The support rotor 16 is supported by the charging device 14 and is rotatable about a vertical rotation axis that generally coincides with the furnace axis A. The rotor 16 forms a hollow body that provides an internal space for charge material passage into the furnace 10 coaxially to the furnace axis A, e.g. through a feeder spout that defines a charge material passage (not shown). The support rotor 16 includes a pivotable mounting structure 18 with two disc-shaped suspension flanges 20 arranged in facing relationship on opposite sides of axis A. The mounting structure 18 with the suspension flanges 20 is pivotable about a pivoting axis B, indicated by a cross in FIG. 1 and FIG. 2, which is orthogonal to axis A, i.e. perpendicular to the plane of FIG. 1 and FIG. 2. The suspension flanges 20 are mounted with their disc centers eccentric with respect to axis B on support shafts that define the pivoting axis B and are connected to a driving mechanism (not shown) for pivoting the suspension flanges 20 (see FIG. 2).

Figure 2:
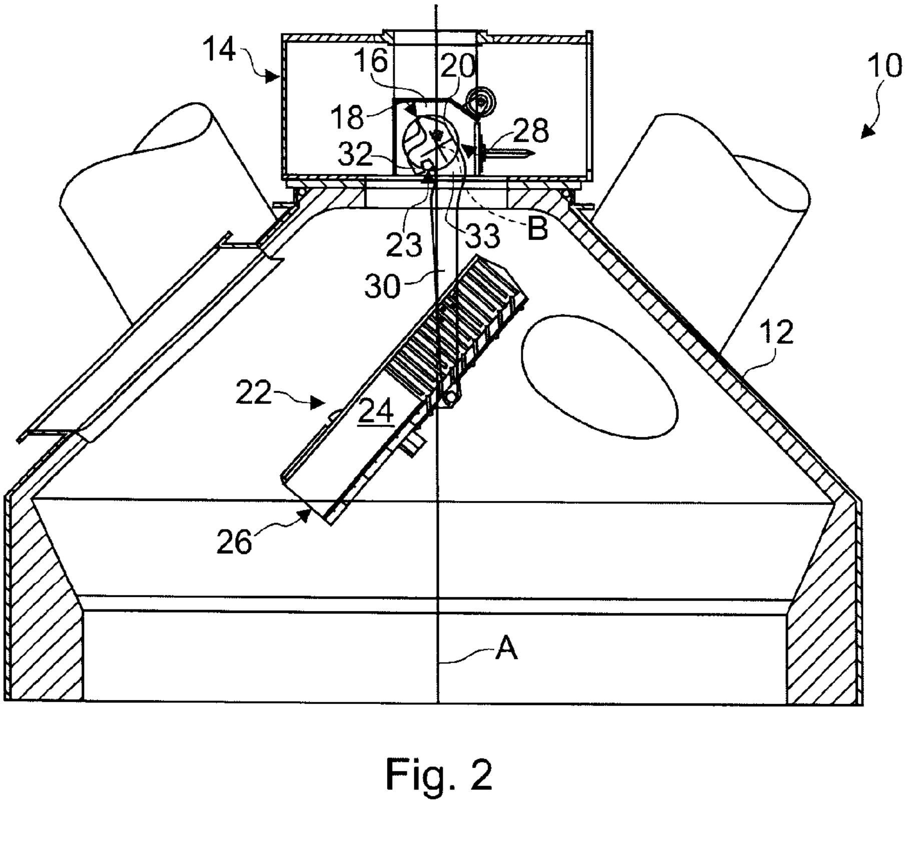
FIG. 2 is a view according to FIG. 1 showing the distribution chute in operational position when it is mounted to the charging device.

FIGS. 1&2 further show a distribution chute 22 that comprises an elongated main body 24 in the form of trough-shaped main part. The main body 24 defines a sliding channel for bulk material that is fed by the charging device 14 along axis A, through the hollow support rotor 16, onto the chute 22. Charge material can slide on the main body 24 towards the outlet 26 of the chute 22. By rotating the chute 22 about axis A and pivoting the chute 22 about axis B, the charging device 14 allows distributing charge material to any location inside the furnace 10. The configuration of the main body 24 as such can correspond for example to that described in GB 1 487 527 but is in any case not of importance to the present invention.

For removable mounting of the distribution chute 22 to the charging device 14, the chute 22 comprises chute-mounting members 28 on one end portion of elongated suspension arms 30 that have another opposite end portion fixed laterally to the main body 24. Each chute-mounting member 28 has a respective hook-shaped portion, generally indicated by reference sign 32. The hook-shaped portions 32 allow removable mounting of the chute 22 on respective cooperating supports 23 on the mounting structure 18, in particular on the suspension flanges 20, of the charging device 14 as will be detailed further below. As seen in FIGS. 1-2, the elongated suspension arms 30 are fixed to the main body 24 at an angle α, chosen in function of the conicity of the furnace throat 12. Each arm 30 also has a bent portion 33 in between its fixation to the main body 24 and the chute-mounting member 28. The bent portion 33 allows adapting the chute 22 to the conicity of the furnace throat 12 and increasing the angle α. Due to the bent portion 33, the available fixation length of the arms 30 to the main body 24 is increased and the suspension arms 30 are adapted to limited space available inside the support rotor 16 in horizontal direction. It will also be appreciated, that depending on the furnace throat conicity and the design of the charging device, the suspension arms as such may be omitted, i.e. the chute-mounting members as proposed herein can be attached directly to the main body of the chute in an alternative embodiment.

FIG. 1 shows the distribution chute 22 during a replacement procedure, i.e. where the chute 22 is removed from or installed onto the charging device 14. As seen in FIG. 1, the chute 22 is hoisted by means of a main hoisting cable 34, attached to the main body 24 near the outlet 26, and two auxiliary hoisting cables 36 attached to either suspension arm 30 respectively. Any type of rope, cable or chain 34, 36 that can support the weight of the chute 22 may be used for hoisting. The chute 22 is passed through an access door 37 in the shell of furnace 10.

Figure 3A:
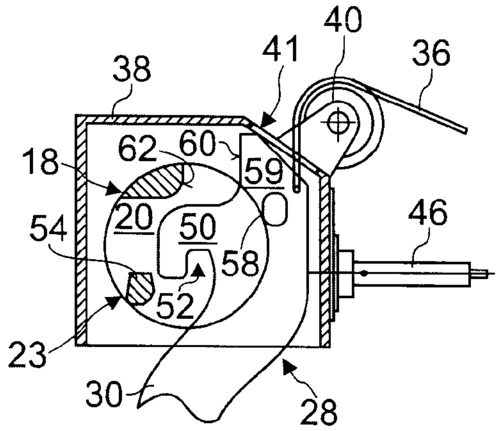
FIGS. 3A-3D are enlarged partial vertical cross sectional views illustrating the procedure for mounting the distribution chute of FIG. 1 to the charging device.

FIG. 3A shows a further step during installation of the chute 22 on the charging device 14. As seen in FIG. 3A, the arms 30 of the chute 22 are lifted by means of the auxiliary hoisting cables 36 i.e. hoisted into a casing 38, in which the suspension flanges 20 of the mounting structure 18 are arranged. Casing 38 also houses the driving mechanism connected to the suspension flanges 20 for pivoting a mounted chute 22 about axis B. For hoisting purposes, deflection pulleys 40 are fixed to the casing 38 and allow deviating the auxiliary hoisting cables 36, via an opening 41 in the casing 38, through a door 42 in the housing 44 of the charging device 14 (see FIG. 1) towards an external winch mechanism (not shown). As will be appreciated, the hoisting cables 36, instead of a special purpose holding device as used in the prior art, are used for hoisting the mounting members 28 towards and into the support rotor 16.

Figure 3B:
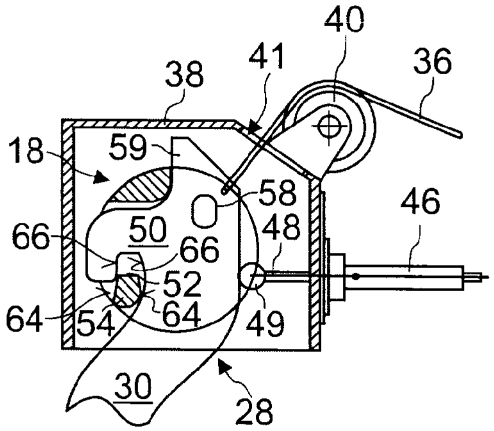
Figure 3C:
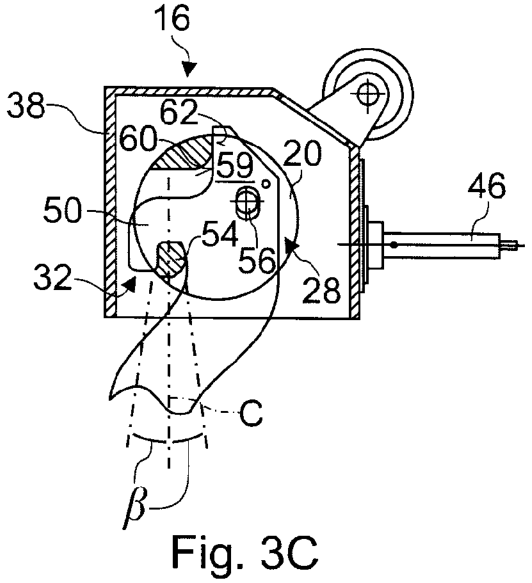
Figure 3D:
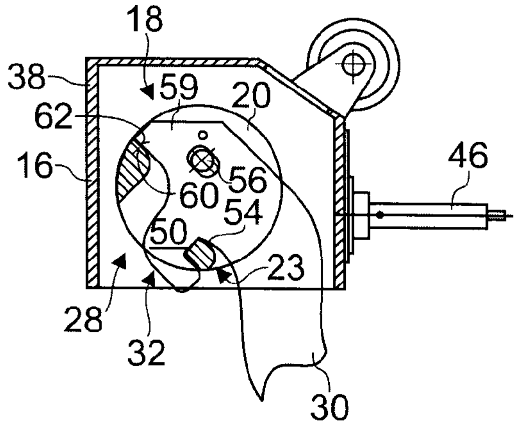
Figure 4:
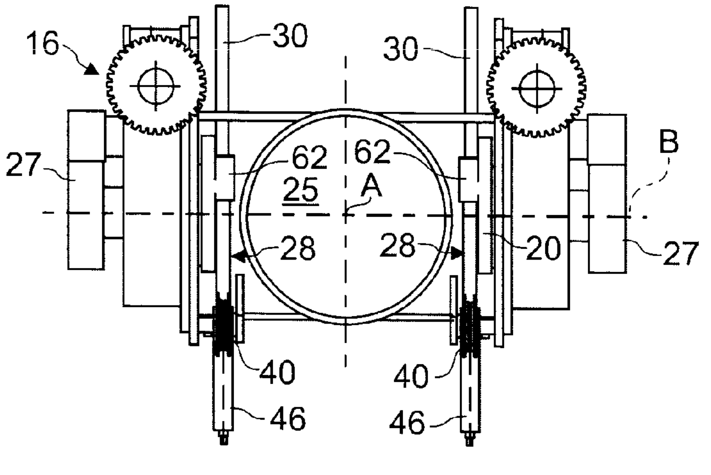
FIG. 4 is a top view of the chute-mounting configuration according to FIGS. 1-3.

FIG. 3B shows the next step of the installation procedure, in which the mounting members are brought into position for hooking engagement. To this end, a linear actuator 46, which is removably attached to the casing 38 as shown in FIGS. 3A-D, is used. Once the hook-shaped portions 32 are positioned as shown in FIG. 3A, the linear actuator 46, e.g. a hydraulic cylinder, is operated. A plunger 48 of the actuator 46 may compris a cross bar 49 for abutment with both arms 30, or two linear actuators 46, one for each chute-mounting member 28 may be provided (as seen in FIG. 4). Upon stroke, the plunger 48 pushes both chute-mounting members 28 by translation towards the supports 23. At the same time the hoisting cables 36 are slightly unwound to avoid lifting of the chute 22. At full stroke of the plunger 48, the chute-mounting members 28 have reached the position shown in FIG. 3B.

In the following step, passing from the position in FIG. 3B to that in FIG. 3C, the chute 22 is coupled to the mounting structure 18 and thereby to the support rotor 16 by means of engagement of the hook-shaped portions 32 with the supports 23. As seen in FIGS. 3A-D, the hook-shaped portions 32 on the upper end portion of each suspension arm 30 is formed by a recurved bent back projection 50 and defines a recess 52. As will be noted, each chute-mounting member 28, although it may be attached as a separate part, is preferably made as an integral part of the respective arm 30. Each cooperating support 23 projects transversely from the respective flange 20 towards the opposite flange 20 (as best seen in FIG. 4), to define a tenon 54 that is conjugated in shape to the mortise-like recess 52. Hence, recess 52 and tenon 54 provide a mortise-and-tenon type positive locking and block the arms 30 of the chute 22 in rotationally stiff manner on the suspension flanges 20 and so as to avoid displacement of the chute-mounting members 28 transversely to the engagement direction, which is identified by reference C in FIG. 3C. As will be appreciated, the claw-shaped projection 50 of each chute-mounting member 28 and the tenon 54 of each suspension flange 20 are dimensioned such that the mortise-and-tenon-type support can bear at least the entire weight of the chute 22. Engagement of the the hook-shaped portions 32 with the supports 23 is achieved by lowering the arms 30 with their chute-mounting members 28, unwinding the hoisting cables 36, along the engagement direction as indicated by axis C, such that the mortise-like recess 52 and tenon 54 engage.

FIG. 3C also illustrates that the tenon 54 forming the support 23 and the recess 52 each have opposite side flanks 64, 66 (see FIG. 3B) that are at an angle with respect to the engagement direction along axis C, downwards in FIG. 3C but depending on the pivotal angle of the flanges 20. In the preferred embodiment, the flanks 64, 64 are at equal angles β of about 5° to 15° with respect to axis C, with the tenon 54 widening in engagement direction, such that tenon 54 and recess 52 define a coupling taper to ensure force transmission through the entire surface of the side flanks 64, 66 so as to avoid an excessive concentrated load (point load). The angle is however chosen to be smaller than the corresponding self-blocking angle in order to facilitate removal of the chute 22, i.e. detaching the chute-mounting members 28, in particular the hook-shaped portions 32 from the supports 23.

Once engaged as shown in FIG. 3C, the hook-shaped portions 32 with the supports 23, forming mortise-and-tenon-type couplings, safely support the chute 22 in the charging device 14. Subsequently, the hoisting cables 36 are removed. For further safety, eccentric tappets 56, each being extractable and rotatably supported on the respective suspension flange 20, are inserted through an oblong tappet hole 58 in the upper end portion of each arm 30. The eccentric tappets 56 are rotated so as to press and hold a flat stop face 60 integrally formed on the upper end of each arm 30 into abutment with a corresponding counter abutment 62, also in the form of a stop face, on each flange 20. The tappets 56 are blocked and, by virtue of an oblique longitudinal axis of the oblong tappet hole, also secure engagement of recess 52 and tenon 54.

Thereby, the configuration shown in FIG. 3C is obtained in which the chute 22 is securely mounted to the charging device 14. Subsequently, pivoting torque can be transmitted to the chute 22 as seen in FIG. 3D. As will be appreciated from FIGS. 3A-D, by virtue of the flat stop faces 60, the chute-mounting members 28 thus each comprise, in addition to the hook-shaped portion 32 for removable attachment, an abutment portion, generally indicated by reference sign 59. The abutment portion 59 is also used to bring the chute-mounting members 28 into a position ready for hooking engagement of the hook-shaped portions 32 with the supports 23 by bringing the respective chute-mounting member 28 into abutment with the corresponding flange 20, i.e. with the counter-abutments 62, as seen in FIG. 3B. Since the stop face 60 extends in parallel to the hook engagement direction C, hooking engagement as seen in FIG. 3C can be achieved, simply by lowering the chute-mounting members 28 i.e. unwinding the hoisting cables 36 with the stop faces 60, 62 remaining in abutment.

Once the chute-mounting members 28 are engaged on the suspension flanges 20, the chute 22 is safely mounted to the support rotor 16 even before the eccentric tappets 56 are engaged. By virtue of the proposed configuration, simple maneuvers allow bringing the chute 22 into engagement with the flanges 20, i.e. a simple hoist can be used for installing and removing the chute 22. Hence, the need for special equipment to support the chute is eliminated. It will be understood, that removal of the chute 22 can also be carried out in simple and rapid manner by reversing the procedure described above. It will also be understood, that the stop faces 60, 62 are oriented and positioned relative to the supports 23 (above in FIGS. 1-7, below in FIG. 8) so as to take up or carry torque (moment/couple) exerted onto the supports 23 due to the center of gravity of the chute 22, possibly including charge material, being located laterally offset of the vertical plane passing trough the supports 23 during normal operation. Hence, the abutment portion 59 and the cooperating counter-abutment 62 are designed to effectively preclude weight-induced pivoting of the chute-mounting members 28 and hence the chute 22 about the supports 23 on the suspension flanges 20.

FIG. 4 shows, in top view, main parts of the support rotor 16, including the opposite suspension flanges 20, between which space is provided for a central passage 25 for charge material. FIG. 4 also schematically illustrates gear boxes 27 of the drive mechanism, which have output shafts to which the flanges 20 are fixed for pivoting the chute by pivoting the mounted chute 22 about axis B. FIG. 4 also illustrates the flat plate-like shape of the arms 30 and their mounting members 28, when seen in top view (fully black elements). FIG. 4 further shows an arrangement of two removable hydraulic cylinders 46 for moving the mounting members 28 from the position of FIG. 3A to that of FIG. 3B as described above, and the pulleys 40, by means of which the hoisting cables 36 are guided inside the charging device 14, for lifting the mounting members 28 into the position of FIG. 3A.

Figure 5A:
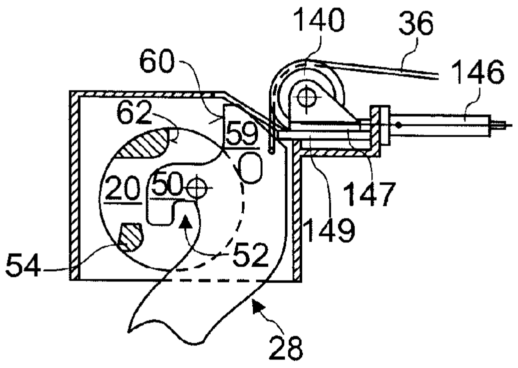
FIGS. 5A-5B are partial vertical cross sectional views illustrating an alternative arrangement for performing the procedure for mounting the distribution chute of FIG. 1 to the charging device.
Figure 5B:
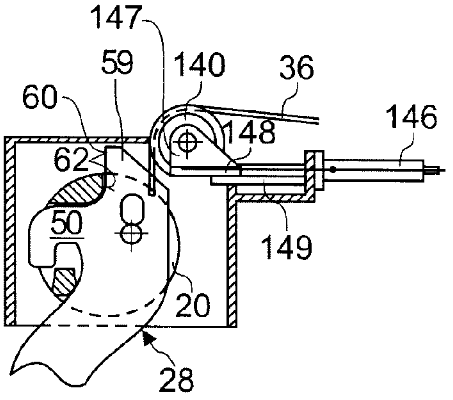

FIGS. 5A-B illustrate an alternative arrangement for performing the lateral translation of the mounting members 28 into position ready for hooking engagement, in similar manner to the translation as illustrated by FIGS. 3A-B. In the embodiment of FIGS. 5A-B, hydraulic cylinders 146 are used to push a movably supported pulley 140, which is arranged on a tray 147 that is supported by a sliding guide 149 so that the pulley 140 is horizontally translatable. Hence instead of pushing directly onto the mounting members 28, the plungers 148 of the hydraulic cylinders 146 are operably connected to the trays 147. By moving the pulleys 140 laterally, the chute 22 supported thereon by means of the hoist cables 36 fastened to the mounting members 28, the arrangement of FIGS. 5A-B also allows bringing the chute 22 into the pre-engagement position for engaging the hook-shaped portion 50 with the flanges 20. As in FIG. 3B, this pre-engagement position is reached, when the abutment portion 59 abuts with the counter abutment 62. As in FIG. 3B, the flat stop face 60 extends in parallel with the hook engagement direction (see reference C in FIG. 3C).

Figure 6:
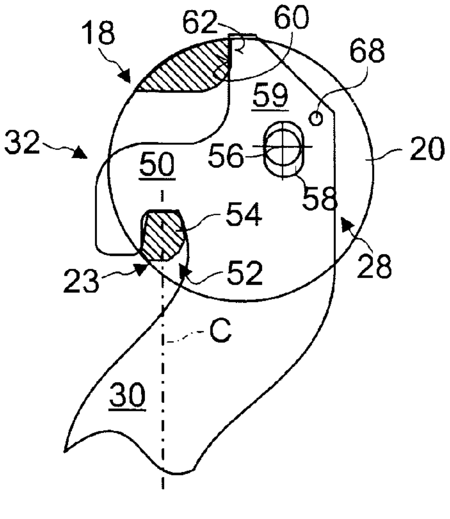
FIG. 6 is an enlarged side view showing a chute-mounting member of the distribution chute of FIGS. 1-5 and a corresponding mounting structure on the chute supporting rotor of the charging device.

FIG. 6 shows in more detail an enlarged view of the configuration of the chute-mounting members 28 of the chute 22 and the associated mounting structure 18 of the support rotor 16. The tenon 54 and the counter abutment 62 are separated by a distance which improves torque transmission and also allows passage of the claw-shaped portion 50 of the suspension arm 30 (see FIG. 3B). The flat stop face 60 formed by a protrusion on the arm 30 is parallel to the engagement or release direction, i.e. to axis C and is firmly pressed against the counter abutment 62 by means of the blocked eccentric tappet 56. The eccentric tappet 56 provides additional safety of fixation and may reduce backlash between the mortise-like recess 52 and tenon 54 caused by the considerable pivoting torques. The eccentric tappet 56 also serves to take up any opposite torque about the supports 23, i.e. any torque opposite to that taken up by the stop faces 60, 62 of the abutment portion 59 and the counter-abutment on the flanges 20 respectively. In the illustrated configuration, such opposite torque occurs for example in case the main body 24 of the chute 22 is brought into a more vertical position than that shown in FIG. 2 e.g. for central charging. More generally, such opposite torque occurs if the chute is pivoted into positions, in which the center of gravity of the chute 22 (possibly including charge material) has passed from the side of the vertical plane passing through the supports 23 in which torque is taken up through the stop faces 60, 62, to the other side of that plane.

The oblong shape of tappet hole 58 facilitates insertion of the tappet 56 and allows eccentric action of the latter. As further seen in FIG. 6, each suspension arm 30 comprises a through-bore 68 as fastening means for connecting the hoisting cables 36. As will be understood from FIG. 6 in combination with FIG. 1, the recess 52 is oriented with its aperture towards the main body 24 of the chute 22, approximately toward the centre of gravity of the chute. Thereby, advantage is taken of the weight of the chute 22 to contribute to full engagement of the mortise-and-tenon-type coupling between the supports 23 and the hook-shaped portion 32, and a risk of dropping the chute 22 is eliminated.

Figure 7:
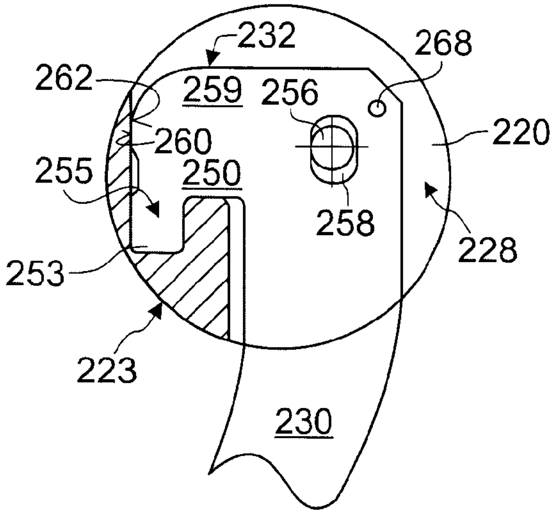
FIG. 7 is an enlarged side view showing a second embodiment of a chute-mounting member and a corresponding mounting structure.

FIG. 7 shows a second embodiment of chute-mounting members 228 with a hook-shaped portion 232 and a conjugated rotor-side support 223 on the suspension flanges 220. In the embodiment of FIG. 7, a single protrusion formed integrally on the suspension flange 220 has two functions: it provides a mortise-like recess 255 on the suspension flange 220, and a counter-abutment in the form of a flat stop face 262. Accordingly, the recurved projection 250 of chute-mounting members 228 in FIG. 7 is used to engage the support 223 by means of a nose 253 that cooperates with the recess 255 on the suspension flange 220. In other words, the tip of the projection 250, rather than the recess defined thereby (as in FIGS. 1-6), is used in this embodiment for engagement of the hook-shaped portion 232 on the supports 223. Furthermore, the abutment potion 259, which carries the flat stop face 260 cooperating with the flat stop face 262 as counter-abutment on the flanges 220, has a different shape. Whereas the chute-mounting member 28 of the first embodiment of FIGS. 1-6 is generally shaped like the head of a horse, or sea-horse, the chute-mounting member 228 of FIG. 7 generally resembles the head of a parrot. Other aspects of the mounting configuration shown in FIG. 7 correspond to those set out with respect to FIG. 6.

Figure 8:
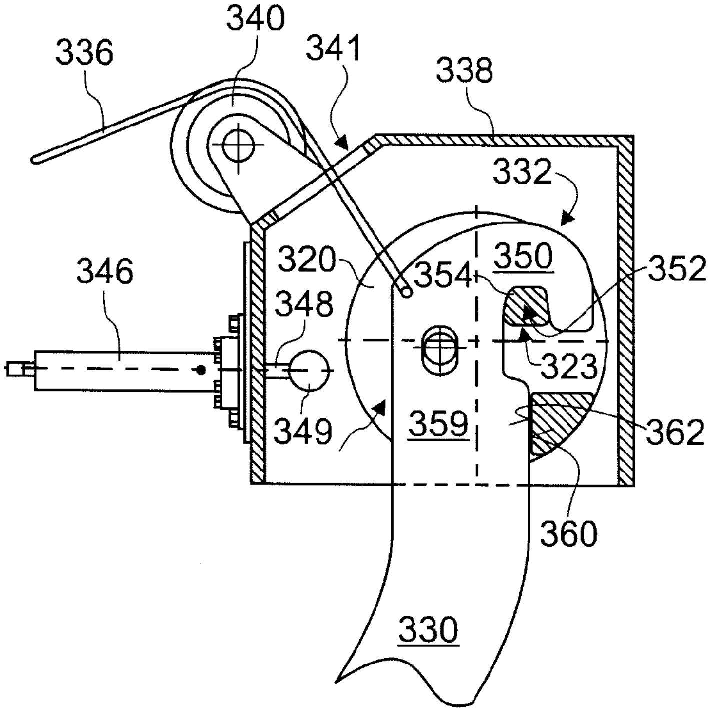
FIG. 8 is an enlarged side view showing a third embodiment of a chute-mounting member and a corresponding mounting structure.

FIG. 8 shows a third embodiment of chute-mounting members 328 with a hook-shaped portion 332 and a conjugated rotor-side support 323 on the suspension flanges 320. Major differences of the suspension flanges 320 in the configuration of FIG. 7 with respect to the first embodiment are that the support 323, although comprising a tenon 354 of similar shape, is arranged above the counter abutment 362 instead of below. Correspondingly the torque relationship is inversed and the abutment in FIG. 7 is in the direction opposite to that of FIG. 6 and hence the generally horizontally mirrored arrangement. Accordingly, regarding the chute-mounting member 328 of FIG. 8, the projection 350 of the hook-shaped portion 332 is on the side away from the outlet end of the chute 22. The mortise-like recess 352 and the cooperating tenon 354 of the support 323 as such are however of identical shape as described for the first embodiments. As further seen in FIG. 8, the abutment portion 359 is arranged below the hook-shaped portion 332 and comprises a flat stop face 360 respectively formed by the narrow side of the arms 330, which cooperates with the flat stop face forming the counter-abutment 362 on the suspension flanges 320. Both stop faces 360, 362 extend in parallel to the hook engagement direction as in the second embodiment. Other features of the mounting configuration shown in FIG. 8, which are indicated by reference numerals with incremented hundreds digit correspond to those explained with regard to the first embodiment of FIGS. 1-4.

The invention claimed is:

1. A charging device for a shaft furnace, comprising:

a distribution chute having an elongated chute body providing a sliding channel for bulk material and two chute-mounting members attached laterally to either side of said chute body for mounting said distribution chute to said charging device;

a mechanism for rotating said distribution chute, said mechanism having a rotatable support rotor with two suspension flanges cooperating with said chute-mounting members of said distribution chute for mounting said distribution chute;

wherein each of said chute-mounting members comprises a hook-shaped portion that forms a suspension hook for mounting said distribution chute to said suspension flanges;

wherein each of said suspension flanges has a support configured for engagement with said hook-shaped portion along a hook engagement direction; and wherein each of said chute-mounting members comprises an abutment portion that cooperates with a counter-abutment on the corresponding suspension flange to provide abutment in a direction transversal to said hook engagement direction so as to preclude pivoting of said distribution chute about the supports of said suspension flanges.

2. The charging device according to claim 1, wherein each hook-shaped portion includes a projection and a recess and wherein each support is configured for engagement with said recess of said hook-shaped portion along said hook engagement direction.

3. The charging device according to claim 1, wherein each hook-shaped portion includes a projection and a recess and wherein each support is configured for engagement with said projection of said hook-shaped portion along said hook engagement direction.

4. The charging device according to claim 1, wherein each abutment portion of said chute-mounting members comprises a flat stop face extending in parallel to said hook engagement direction, which cooperates with the counter-abutment on the corresponding suspension flange so as to preclude pivoting of said chute about said supports; or each counter-abutment of said suspension flanges comprises a flat stop face extending in parallel to said hook engagement direction, which cooperates with the abutment portion on the corresponding chute-mounting member so as to preclude pivoting of said chute about said supports; or each abutment portion and each counter-abutment comprises a flat stop face extending in parallel to said hook engagement direction, the stop face of a chute-mounting member cooperating with the stop face on the corresponding suspension flange so as to preclude pivoting of said distribution chute about said support.

5. The charging device according to claim 1, wherein said hook-shaped portions and said supports are configured to provide rotationally stiff engagement by positive locking.

6. The charging device according claim 5, wherein said hook-shaped portions and said supports are configured to provide a mortise-and-tenon type engagement precluding displacement of engaged chute-mounting members relative to said suspensions flanges in both directions transversely to said hook engagement direction.

7. The charging device according to claim 1, wherein each hook-shaped portion includes a projection or a recess that comprises opposite flanks arranged at an angle with respect to the hook engagement direction so as to define a coupling taper and cooperates with conjugated opposite flanks on the support of the corresponding suspension flange.

8. The charging device according to claim 7, wherein said opposite flanks are at equal angles of about 5° to 15° with respect to the hook engagement direction.

9. The charging device according to claim 1, wherein each hook-shaped portion includes a projection or a recess that is oriented towards said chute body.

10. The charging device according to claim 1, further comprising at least one linear actuator with a plunger for bringing said chute into a position for engaging each said hook-shaped portion on its corresponding support by pushing said chute-mounting members with their abutment portions into abutment with the corresponding counter-abutment.

11. The charging device according to claim 1, wherein the distribution chute comprises an elongated suspension arm having a first end portion fixed laterally to said chute body and a second end portion, the respective chute-mounting member being integrally formed with or attached to said second end portion.

12. The charging device according to claim 11, wherein each suspension arm comprises a bent portion between said first end portion and said second end portion.

13. The charging device according to claim 1, wherein each chute-mounting member comprises a tappet hole for receiving an eccentric tappet of the corresponding suspension flange, said tappet hole being preferably oblong with a longitudinal axis oriented so that said tappet can reinforces engagement of the corresponding hook-shaped portion with the corresponding support.

14. The charging device according to claim 1, wherein each chute-mounting member comprises fastening means for fastening said chute to a cable hoist.

15. A distribution chute for a charging device according to claim 1 comprising:

an elongated chute body providing a sliding channel for bulk material and two chute-mounting members attached laterally to either side of said chute body for mounting said distribution chute to a charging device that comprises two suspension flanges cooperating with said chute-mounting members of said distribution chute for mounting said distribution chute;

wherein each of said chute-mounting members comprises a hook-shaped portion that forms a suspension hook for mounting said distribution chute to said suspension flanges by engagement of a corresponding support on said suspension flanges with said hook-shaped portion along a hook engagement direction; and wherein each of said chute-mounting members comprises an abutment portion that cooperates with a counter-abutment on the corresponding suspension flange to provide abutment in a direction transversal to said hook engagement direction so as to preclude pivoting of said distribution chute about the supports of said suspension flanges.

16. Method of installing a distribution chute in a charging device of a shaft furnace, wherein:

said distribution chute has two chute-mounting members attached laterally to either side of an elongated chute body, each chute-mounting member comprising an abutment portion and a hook-shaped portion that forms a suspension hook for mounting said distribution chute to said charging device;

said charging device comprises a rotatable support rotor with two suspension flanges for mounting said distribution chute, each suspension flange having a support configured for engagement with said hook-shaped portion along a hook engagement direction and a counter-abutment that cooperates with said abutment portion on the corresponding chute-mounting member to provide abutment in a direction transversal to said hook engagement direction;

said method comprising:

fastening hoisting means to said chute-mounting members;

hoisting said chute-mounting members into said support rotor using said hoisting means; and hooking said distribution chute to said support rotor by engaging each hook-shaped portion on said supports along said hook engagement direction in such a way that said distribution chute is supported through said hook-shaped portions on said supports and pivoting of said distribution chute about said supports is precluded by abutment of said abutment portions with said counter-abutments.

* * * * *